(12) United States Patent
Khan et al.

(10) Patent No.: US 10,891,029 B2
(45) Date of Patent: Jan. 12, 2021

(54) REPORTING LOCATIONS BEING ASSOCIATED WITH A PROBLEM

(71) Applicant: HERE Global B.V., Eindhoven (NL)

(72) Inventors: Muhammad Irshan Khan, Tampere (FI); Lauri Aarne Wirola, Tampere (FI); Jari Tapani Syrjärinne, Tampere (FI); Pavel Ivanov, Tampere (FI)

(73) Assignee: HERE Global B.V., Eindhoven (NL)

(*) Notice: Subject to any disclaimer, the term of this patent is extended or adjusted under 35 U.S.C. 154(b) by 179 days.

(21) Appl. No.: 15/294,189

(22) Filed: Oct. 14, 2016

(65) Prior Publication Data
US 2018/0107355 A1 Apr. 19, 2018

(51) Int. Cl.
| | | |
|---|---|---|
| *G06F 3/048* | (2013.01) | |
| *G06F 3/0484* | (2013.01) | |
| *G01C 21/32* | (2006.01) | |
| *G09B 29/10* | (2006.01) | |
| *G06F 3/0488* | (2013.01) | |
| *G06F 3/14* | (2006.01) | |
| *G08B 25/00* | (2006.01) | |
| *G06F 16/29* | (2019.01) | |

(52) U.S. Cl.
CPC ........... *G06F 3/0484* (2013.01); *G01C 21/32* (2013.01); *G06F 3/04883* (2013.01); *G06F 3/14* (2013.01); *G08B 25/00* (2013.01); *G09B 29/106* (2013.01); *G06F 16/29* (2019.01)

(58) Field of Classification Search
None
See application file for complete search history.

(56) References Cited

U.S. PATENT DOCUMENTS

| | | | | |
|---|---|---|---|---|
| 6,253,151 | B1* | 6/2001 | Ohler | G01C 21/32 340/990 |
| 7,286,835 | B1* | 10/2007 | Dietrich | H04W 64/00 455/456.1 |
| 8,386,422 | B1* | 2/2013 | Kadous | G01C 21/206 707/609 |
| 9,432,636 | B2* | 8/2016 | Gourlay | H04N 7/183 |
| 9,723,510 | B1* | 8/2017 | Beluri | H04W 24/02 |
| 2005/0283699 | A1* | 12/2005 | Nomura | G01C 21/32 714/746 |
| 2008/0082225 | A1* | 4/2008 | Barrett | G01C 21/32 701/26 |
| 2008/0195638 | A1* | 8/2008 | Winberry | G01C 21/32 |
| 2011/0246148 | A1* | 10/2011 | Gupta | H04W 4/024 703/2 |

(Continued)

FOREIGN PATENT DOCUMENTS

| | | |
|---|---|---|
| GB | 2425858 A | 11/2006 |
| WO | WO2015104211 A1 | 7/2015 |

OTHER PUBLICATIONS

PCT International Search Report and Written Opinion of the International Searching Authority dated Jan. 19, 2018 or corresponding PCT/EP2017/075885.

(Continued)

*Primary Examiner* — Hua Lu
(74) *Attorney, Agent, or Firm* — Lempia Summerfield Katz LLC

(57) ABSTRACT

It is disclosed a method including obtaining, via a user interface, information being associated with a location of a map, the location of the map being considered to be associated with a problem.

18 Claims, 12 Drawing Sheets

(56) References Cited

U.S. PATENT DOCUMENTS

| | | | | |
|---|---|---|---|---|
| 2011/0269479 A1* | 11/2011 | Ledlie | G01S 11/06 | 455/456.1 |
| 2012/0072106 A1* | 3/2012 | Han | G01C 21/206 | 701/410 |
| 2012/0176525 A1* | 7/2012 | Garin | H04W 4/21 | 348/333.02 |
| 2012/0191512 A1* | 7/2012 | Wuoti | H04W 4/33 | 705/14.1 |
| 2013/0035109 A1* | 2/2013 | Tsruya | G01S 5/0252 | 455/456.1 |
| 2013/0162481 A1* | 6/2013 | Parvizi | G01S 5/0205 | 342/452 |
| 2013/0196684 A1* | 8/2013 | Dong | H04W 4/33 | 455/456.1 |
| 2013/0238236 A1* | 9/2013 | Thrun | G01C 21/206 | 701/418 |
| 2013/0326380 A1* | 12/2013 | Lai | G01C 21/32 | 715/765 |
| 2014/0011518 A1* | 1/2014 | Valaee | H04W 4/33 | 455/456.1 |
| 2014/0128093 A1* | 5/2014 | Das | H04W 64/006 | 455/456.1 |
| 2014/0243017 A1* | 8/2014 | Das | G01C 21/206 | 455/456.2 |
| 2014/0335893 A1* | 11/2014 | Ronen | G01S 5/0252 | 455/456.1 |
| 2014/0347492 A1* | 11/2014 | Fales | G01C 11/06 | 348/164 |
| 2015/0058300 A1* | 2/2015 | Perczynski | G06F 16/24 | 707/690 |
| 2015/0061938 A1* | 3/2015 | Moraleda | G01C 21/165 | 342/452 |
| 2015/0133149 A1* | 5/2015 | Kim | H04W 64/00 | 455/456.1 |
| 2015/0230100 A1* | 8/2015 | Atia | H04W 16/20 | 370/252 |
| 2015/0237480 A1* | 8/2015 | Fang | G01S 5/0252 | 455/456.6 |
| 2015/0241223 A1* | 8/2015 | Davidson | G01C 21/32 | 701/532 |
| 2015/0304634 A1* | 10/2015 | Karvounis | G06K 9/00201 | 348/46 |
| 2016/0005229 A1* | 1/2016 | Lee | G06F 3/0488 | 345/419 |
| 2016/0179830 A1* | 6/2016 | Schmalstieg | G06F 16/5866 | 707/722 |
| 2016/0316342 A1* | 10/2016 | Narasimhan | H04W 4/029 | |
| 2016/0371394 A1* | 12/2016 | Shahidi | G01S 5/0252 | |
| 2018/0288728 A1* | 10/2018 | Berkovich | H04W 64/00 | |

OTHER PUBLICATIONS

Chul; et al. User Participation-based Indoor Location Service, < http://www.lifesciencesite.com/lsj/life1107/125_25022life110714_876_881.pdf >, 2014.

Mahtab; et al., Utilization of User Feedback in Indoor Positioning System < https://www.researchgate.net/profile/AKM_Mahtab_Hossain/publication/220310473_Utilization_of_user_feedback_in_indoor_positioning_system/links/0046352e1297051eeb000000.pdf>, Aug. 2010.

Steven; et al. Employing User Feedback for Fast, Accurate, Low-maintenance Geolocationing < http://cseweb.ucsd.edu/~wgg/Abstracts/ac-locator.pdf >, 2004.

Yan; et al. Enhancing Wi-fi Fingerprinting for Indoor Positioning Using Human-centric Collaborative Feedback, http://rdcu.be/IrSh, 2013.

European Office Action for European Patent Application No. 17 790 703.7-1001 dated Jan. 23, 2020.

European Office Action for European Patent Application No. 17 790 7017-1001 dated Oct. 28, 2020.

\* cited by examiner

REPORTING LOCATIONS BEING ASSOCIATED WITH A PROBLEM

FIELD OF THE DISCLOSURE

The invention relates to the field of obtaining, via a user interface, information being associated with a location of a map.

BACKGROUND

Indoor positioning requires novel systems and solutions that are specifically developed and deployed for this purpose. The "traditional" positioning technologies which are used mainly outdoors, i.e. satellite and cellular positioning technologies, cannot deliver such a performance indoors that would enable seamless and equal navigation experience in both environments. The required positioning accuracy (2-3 m), coverage (~100%) and floor detection are challenging to achieve with satisfactory performance levels with the systems and signals that were not designed and specified for the indoor use cases in the first place. Satellite-based radio navigation signals simply do not penetrate through the walls and roofs strongly enough for the adequate signal reception and the cellular signals have too narrow bands for accurate ranging by default.

Several indoor-dedicated solutions have already been developed and commercially deployed during the past years e.g. solutions based on pseudolites (GPS-like short-range beacons), ultra-sound positioning, BTLE signals (e.g. Nokia High-Accuracy Indoor Positioning, HAIP) and Wi-Fi fingerprinting (Ekahau, Polestar). What is typical to these solutions is that they require either deployment of totally new infrastructure (beacons, tags and so on) or manual exhaustive radio surveying of the buildings including all the floors, spaces and rooms. This is rather expensive and will take a considerable amount of time to build the coverage to the commercially expected level, which in some cases narrowed the potential market segment only to very thin customer base e.g. for health care or dedicated enterprise solutions. Also, the diversity of these technologies makes it difficult to build a globally scalable indoor positioning solution, and the integration and testing will become complex if a large number of technologies is needed to be supported in the consumer devices, such as smartphones.

For an indoor positioning solution to be commercially successful, that is, 1) being globally scalable, 2) having low maintenance and deployment costs, and 3) offering acceptable end-user experience, the solution needs to be based on an existing infrastructure in the buildings and on existing capabilities in the consumer devices. This leads to an evident conclusion that the indoor positioning needs to be based on Wi-Fi- and/or Bluetooth (BT)-technologies that are already supported in the every smartphone, tablet, laptop and even in the majority of the feature phones. It is now needed to find a solution that uses the Wi-Fi- and BT-radiosignals in such a way that makes it possible to achieve 2-3 m horizontal positioning accuracy, close to 100% floor detection with the ability to quickly build the global coverage for this approach.

An actual approach for radiobased indoor positioning models e.g. the Wi-Fi-radio environment (or any similar radio e.g. Bluetooth) from observed Received Signal Strength (RSS)-measurements as 2-dimensional radiomaps and is hereby able to capture the dynamics of the indoor radiopropagation environment in a compressable and highly accurate way. This makes it possible to achieve unprecedented horizontal positioning accuracy with the Wifi-signals only within the coverage of the created radiomaps and also gives highly reliable floor detection. However, the radiomaps need to be currently surveyed manually, which is blocking rapid global scalability.

Huge volumes of indoor Wi-Fi-measurements data could be harvested via crowd-sourcing if the consumer devices were equipped with the necessary functionality to enable the Wi-Fi-data collection as a background process, naturally with the end-user consent. It could also be possible to use volunteers to survey the sites (buildings) in exchange of reward or recognition and get the coverage climbing up globally in the places and venues important for the key customers. However, the technical challenges related to the harvesting, processing, redundancy, ambiguity and storing the crowd-sourced data need to be understood and solved first, before the Wifi-radiomap creation can be based on the machine learning of the indoor Wi-Fi-radiomaps.

Indoor positioning relies on WLAN APs and/or Bluetooth beacons and on the signal strength field they provide. Now, if the radio node locations or building floor plan (e.g. renovation) change, the radiomap used for positioning will be out-of-date. Moreover, there may be issues in the radio data collection affect the end user experience.

Now, when it comes to the infrastructure changes the indoor positioning provider may not be aware of those changes. Thus, the service end-users suffer from bad performance, but the indoor positioning provider may be completely unaware of the problem.

It is, inter alia, an object of the present invention to improve one or more of the above-described shortcomings.

SUMMARY OF SOME EXAMPLE EMBODIMENTS OF THE INVENTION

According to a first exemplary aspect of the invention, a method is disclosed, which comprises obtaining, via a user interface, information being associated with a location of a map, the location of the map being considered to be associated with a problem.

This method may for instance be performed and/or controlled by an apparatus, e.g. by a terminal or by a mobile device or by a server or by a component, module or functional unit of the apparatus. Alternatively, this method may be performed and/or controlled by more than one apparatus, e.g. by multiple terminals or multiple mobile devices, or servers, e.g. of a server cloud.

According to the first exemplary aspect of the invention, a computer program is disclosed, the computer program when executed by a processor causing an apparatus (e.g. a server or a component, module or functional unit thereof) to perform and/or control the actions of the method according to the first exemplary aspect of the invention. The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory (e.g. a Read-Only Memory (ROM)) or hard disk of a computer, or be intended for distribution of the program, like an optical disc.

According to the first exemplary aspect of the invention, an apparatus is disclosed, configured to perform and/or control or comprising respective means for performing and/or controlling the method according to the first exemplary aspect of the invention.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to the first exemplary aspect of the invention, an apparatus is disclosed, comprising at least one processor and at least one memory including computer program code, the at least one memory and the computer program code configured to, with the at least one processor, cause an apparatus (e.g. a server or a component, module or functional unit thereof) at least to perform and/or control the method according to the first exemplary aspect of the invention.

The above-disclosed apparatus according to the any exemplary aspect of the invention may be a component, module or functional unit for a device. The apparatus may for example be a chip. Alternatively, the disclosed apparatus according to any aspect of the invention may be a device, for instance a server. The disclosed apparatus according to any aspect of the invention may comprise only the disclosed components (e.g. means, processor, memory) or may further comprise one or more additional components.

In exemplary embodiments of the first exemplary aspect of the invention, the information being associated with a location of a map comprises information being indicative of the location.

In exemplary embodiments of the first exemplary aspect of the invention, the location represents an area of the map, and wherein the information being indicative of the location comprises information being descriptive of this area.

In exemplary embodiments of the first exemplary aspect of the invention, the information being descriptive of this area comprises information on a polygon being associated with the area of the map.

In exemplary embodiments of the first exemplary aspect of the invention, the information being descriptive of this area comprises at least one of: (i) information on a movement of a user's finger on at least a part of the map, and/or (ii) information on a movement of an input device on at least a part of the map.

In exemplary embodiments of the first exemplary aspect of the invention, the location represents a point of the map.

In exemplary embodiments of the first exemplary aspect of the invention, it is caused to display the map on a display.

In exemplary embodiments of the first exemplary aspect of the invention, the display is part of the user interface.

In exemplary embodiments of the first exemplary aspect of the invention, information is obtained being indicative of the location of the map being considered to be associated with a problem from an application.

In exemplary embodiments of the first exemplary aspect of the invention, the application represents a location application, in particular a positioning application.

In exemplary embodiments of the first exemplary aspect of the invention, said obtaining information being indicative of the location of the map being considered to be associated with a problem from an application is triggered at least partially based on said obtaining, via the user interface, information being associated with a location of a map.

In exemplary embodiments of the first exemplary aspect of the invention, the information being indicative of the location of the map being considered to be associated with a problem obtained from an application corresponds to a location displayed on the map on the display.

In exemplary embodiments of the first exemplary aspect of the invention, the display is part of the user interface.

In exemplary embodiments of the first exemplary aspect of the invention, the problem is at least one of: (i) bad positioning performance at the location; and/or (ii) incorrectness of the map at the location.

In exemplary embodiments of the first exemplary aspect of the invention, it is caused to transmit a report comprising location information being associated with a location of a map to a server, the location of the map being considered to be associated with a problem.

According to a second exemplary aspect of the invention, a method is disclosed, which comprises receiving at least one report, wherein each report comprises location information being associated with a location of a map, the location of the map being considered to be associated with a problem.

This method may for instance be performed and/or controlled by an apparatus, e.g. by a terminal or by a mobile device or by a server or by a component, module or functional unit of the apparatus. Alternatively, this method may be performed and/or controlled by more than one apparatus, e.g. by multiple terminals or multiple mobile devices, or servers, e.g. of a server cloud.

According to the second exemplary aspect of the invention, a computer program is disclosed, the computer program when executed by a processor causing an apparatus (e.g. a server or a component, module or functional unit thereof) to perform and/or control the actions of the method according to the first exemplary aspect of the invention. The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory (e.g. a Read-Only Memory (ROM)) or hard disk of a computer, or be intended for distribution of the program, like an optical disc.

According to the second exemplary aspect of the invention, an apparatus is disclosed, configured to perform and/or control or comprising respective means for performing and/or controlling the method according to the first exemplary aspect of the invention. The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to the second exemplary aspect of the invention, an apparatus is disclosed, comprising at least one processor and at least one memory including computer program code, the at least one memory and the computer program code configured to, with the at least one processor, cause an apparatus (e.g. a server or a component, module or functional unit thereof) at least to perform and/or control the method according to the first exemplary aspect of the invention.

The above-disclosed apparatus according to the any exemplary aspect of the invention may be a component, module or functional unit for a device. The apparatus may for example be a chip. Alternatively, the disclosed apparatus according to any aspect of the invention may be a device, for instance a server. The disclosed apparatus according to any aspect of the invention may comprise only the disclosed components (e.g. means, processor, memory) or may further comprise one or more additional components.

In exemplary embodiments of the second exemplary aspect of the invention, it is determined whether a location is considered to be associated with a problem based on at least one report of the at least one report.

In exemplary embodiments of the second exemplary aspect of the invention, said at least one report is a plurality of reports, and wherein said determining whether a location is considered to be associated with a problem comprising determining whether a number of reports of the plurality of reports associated with the location exceeds a threshold.

In exemplary embodiments of the second exemplary aspect of the invention, it is provided an alarm message if it is determined that a location is considered to be associated with a problem.

In exemplary embodiments of the second exemplary aspect of the invention, a map comprises at least two areas, wherein it is performed, for each area of the at least two areas: (i) determining the number of records associated with the respective area, and (ii) assigning an indicator to the respective area based on the determined number of records.

In exemplary embodiments of the second exemplary aspect of the invention, it is caused a visualization of the at least two areas as part of map on display, wherein, if an area of the at least two areas is assigned with an indicator, the visualization of this area comprises an information indicating problems associated with at least one location in this area.

According to a third exemplary aspect of the invention, a system is disclosed, comprising at least one apparatus according to the first aspect of the invention and comprising one apparatus according to the second aspect of the invention.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF EXAMPLE EMBODIMENTS

Figure 1:
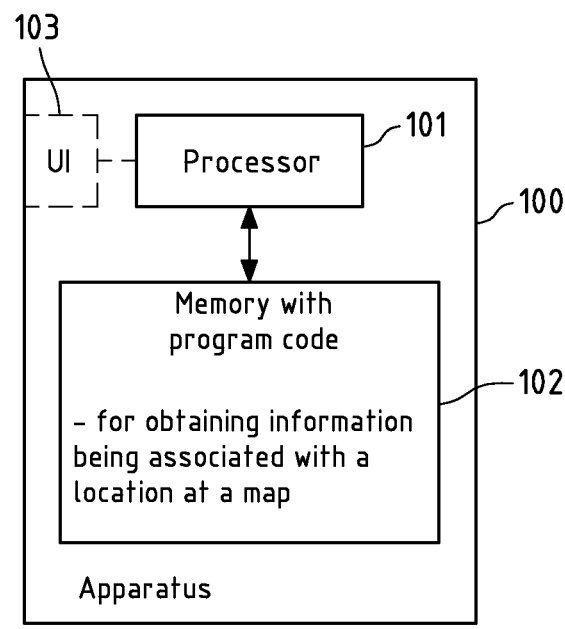
FIG. 1 is a schematic block diagram of an example embodiment of an apparatus according to the first exemplary aspect of the invention.

FIG. 1 is a schematic block diagram of an example embodiment of any apparatus according to the invention. Apparatus 100 comprises a processor 101 and, linked to processor 101, a memory 102. Memory 102 stores computer program code for supporting obtaining information being associated with a location of a map. Processor 101 is configured to execute computer program code stored in memory 102 in order to cause an apparatus to perform desired actions. Memory 102 is thus an example embodiment of a non-transitory computer readable storage medium, in which computer program code according to the invention is stored. Furthermore, apparatus 100 may optionally comprise a user interface (UI) 103 which can be connected to the processor, wherein this connection may be direct or indirect via other entities.

Apparatus 100 could be a server or any other kind of mobile or stationary device. Apparatus 100 could equally be a component, like a chip, circuitry on a chip or a plug-in board, for any mobile or stationary device. Optionally, apparatus 100 could comprise various other components, like a data interface configured to enable an exchange of data with separate devices, a further memory, a further processor, etc. For instance, the optional user interface 103 may comprise a touchscreen and/or a microphone and/or an input device, which might be represent a key pad or a sensing device or a button or any other well-suited input device, and/or a display (which may not represent a touchscreen). Furthermore, as an example, the optional user interface 103 may represent any interface which is connected or configured to be connected to a user interface of another apparatus, wherein the user interface of the other apparatus may comprise a touchscreen and/or a microphone and/or an input device, which might be represent a key pad or a sensing device or a button or any other well-suited input device, and/or a display (which may not represent a touchscreen).

A mobile device, like a mobile communication device, is configured to enable operations while the device is moving. A stationary device is configured to be stationary when in operation and/or fixed to a particular location. A stationary device may be ground based and thus stationary with respect to Earth or only stationary within a particular environment, like a ship.

An operation of an apparatus will now be described with reference to the flow chart of FIG. 2. The operation is an example embodiment of a method according to the invention. Processor 101 and the program code stored in memory 102 cause an apparatus to perform the operation when the program code is retrieved from memory 102 and executed by processor 101. The apparatus that is caused to perform the operation can be apparatus 100 or some other apparatus, for example but not necessarily a device comprising apparatus 100.

The apparatus obtains, e.g. via a user interface, which might represent user interface 103, information being associated with a location of a map, the location of the map being associated with a problem (action 210).

As an example, this map or at least a part of this map may be rendered by a location application, which might be a positioning application, wherein this location application may be executed by the apparatus or by another apparatus. For instance, said positioning application might represent an indoor positioning application, which might be performed based on Wireless LAN (WLAN) and/or Bluetooth. For instance, this positioning application may comprise or may use a positioning engine in order to estimate the actual position of the apparatus.

E.g., the map or part of this map which is caused to being displayed by action 375 may be presented to a user via a display, e.g. a touchscreen or another type of display, wherein this display may be part of the apparatus performing method 375. In one example embodiment, this display is part of the user interface of the apparatus which is configured to obtain information being associated with a location of the map, the location of the map being considered to be associated with a problem, wherein, for instance, in this case the display may represent a touchscreen such that this touchscreen also serves as user interface. In another example embodiment, the display may be distinct from the interface of the apparatus which is configured to obtain information being associated with a location of the map, the location of the map being considered to be associated with a problem.

Figure 2:
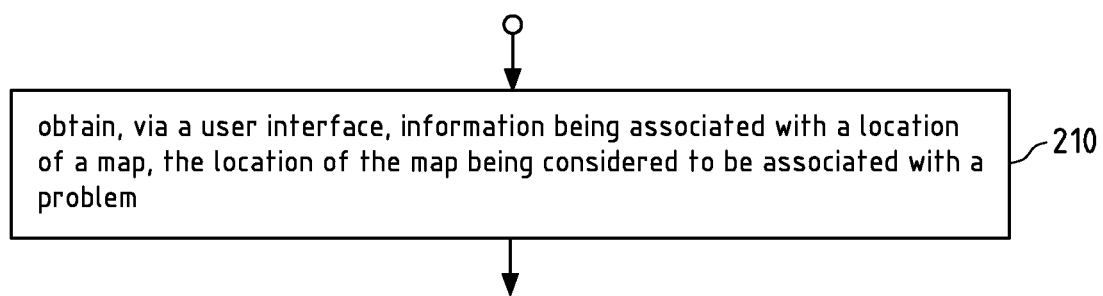
FIG. 2 is a flow chart illustrating an example operation in the apparatus of FIG. 1 according to the first exemplary aspect of the invention.

Furthermore, as an example, the location application which is configured to perform action 375 of method 370 may also be configured to perform method 200 depicted in FIG. 2, and, for instance, further actions of one of apparatuses 100, 300, 300', 400 described in this specification. As another example, method 200 depicted in FIG. 2 may be performed different from a location application which is configured to performed action 375 of method 370, e.g. by means of a different application, e.g. an application configured to receive input from a user via the user interface.

A user, when using this map rendered by the location application, may recognize that the map or a part of the map does not match with the real environment. For instance, if said location application represents a positioning application, infrastructure changes might not have been considered by the positioning application and thus the map may be wrong at certain locations where the infrastructure change has occurred, and/or, if said positioning application is based on WLAN and/or Bluetooth one or more radio nodes may have moved and thus the radio map may be at least partially outdated and incorrect. Then, the user might recognize a bad positioning performance and he might recognize that the displayed map or a part of the displayed is erroneous.

Then, the user may report that a location of the map is considered to be associated with a problem by means of giving a feedback to the apparatus 100, e.g. via the user interface 103, wherein this feedback may be considered as information being associated with a location of the map, the location of the map being considered to be associated with a problem. For instance, this problem might represent a bad positioning performance at the location of the map and/or an incorrectness of the map at the location, e.g. missing constructions or a missing door or another change in the infrastructure which is not correctly reflected by the map.

Thus, the apparatus 100 obtains, e.g. via a user interface, which might represent user interface 103, information being associated with a location of a map, the location of the map being associated with a problem (action 210). Accordingly, method 200 may be used to collect information regarding locations of the map being considered to be associated with a problem. Then, as an example, the information obtained in action 210 may be stored in a memory of the apparatus, e.g. in memory 102 or in another memory.

For instance, this information being associated with a location of a map may comprise an indicator, e.g. at least one bit, configured to specify that the associated location of this information being associated with a location is considered to be associated with a problem. Thus, this information being associated with a location of map can distinguished from a normal user input on the map being displayed on the display, e.g. when the user points to a location on the map in order to define a target destination.

Furthermore, as an example, action 210 may be performed several times such that a plurality of information are obtained, e.g. each time a user wants to report that he considered a location of a map which may be currently displayed to be associated with a problem, wherein each information of the plurality of information is associated with a respective location of a map, the location the location of the map being associated with a problem. For instance, user of the apparatus 100 may report that a location of the map is considered to be associated with a problem by means of giving a feedback to the apparatus 100, e.g. via the user interface 103, at different locations.

According to an example embodiment, the obtained information being associated with a location of a map may comprise information being indicative of the location. For instance, the information being indicative of the location may be descriptive of the location or may identify the location. As an example, this information being indicative of the location may comprise a representative of a geometric shape representing the area in the map. Further examples of this information being indicative of the location will be presented with respect to FIGS. 4a to 4c.

For instance, the apparatus 100 and the method 200 may be associated with the first exemplary aspect of the invention.

Figure 3A:
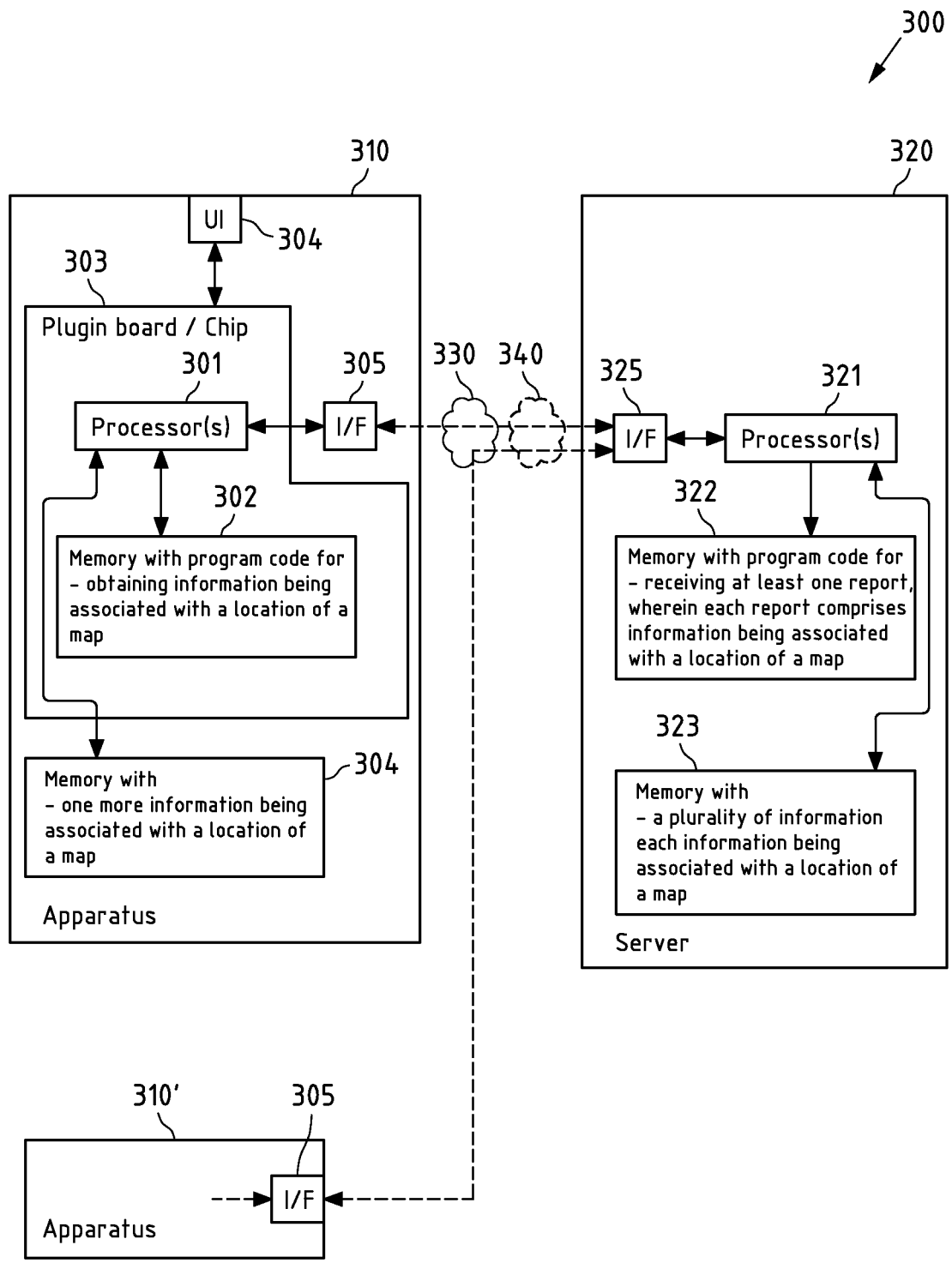
FIG. 3a is a schematic block diagram of an example embodiment of system according to the first and second exemplary aspect of the invention.

FIG. 3a depicts is a schematic block diagram of an example embodiment of a system 300. As an example, this example embodiment of a system 300 will be explained in conjunction with the flow chart illustrating a further example embodiment of a method 300' according to the first exemplary aspect of the invention depicted in FIG. 3b and in conjunction with the flow chart illustrating a further example embodiment of a method 300" according to the second exemplary aspect of the invention depicted in FIG. 3c.

The system comprises at least apparatus 310, 310' and a server 320. For instance, each apparatus of the at least one apparatus 310, 310' may represent an implementation of apparatus 100 and/or may be configured to perform method 200 depicted in FIG. 2. Thus, all explanations given above with respect to apparatus 100 and/or method 200 may also hold for each of the at least one apparatus 310, 310'. Furthermore, as an example, each apparatus of the at least one apparatus 310, 310'' may further be configured to perform the method 300' depicted in FIG. 3b, and/or, as an example, the server 320 may be configured to performed the method 300'' depicted in FIG. 3c.

For instance, each apparatus of the at least one apparatus 310, 310' may be a mobile device, wherein this mobile device may represent regular mobile terminal, like a smartphone or general purpose tablet PC, or a dedicated survey device.

Apparatus 310 comprises a processor 301 that is linked to a first memory 302, to a second memory 304, and to an interface 305 for communication, and to a user interface (UI) (304), which might comprise a touchscreen.

Processor 301 is configured to execute computer program code, including computer program code stored in memory 302, in order to cause mobile survey device 300 to perform desired actions. It is to be understood that processor 301 may comprise or have access to a working memory for this purpose, for example in the form of a random access memory (not shown).

Memory 302 stores computer program code for obtaining information being associated with a location of a map, the location of the map being associated with a problem, wherein this may correspond to action 210 of method 200. For instance, this information may be obtained via user interface 304. As an example, this problem might represent a bad positioning performance at the location of the map and/or an incorrectness of the map at the location, e.g. missing constructions or a missing door or another change in the infrastructure which is not correctly reflected by the map.

In addition, memory 302 may store computer program code configured to realize other functions. Memory 302 may also store for instance an operating system for apparatus 310. In addition, memory 302 may store any kind of data.

Processor 301 and memory 302 may optionally belong to a module 303, like a chip or an integrated circuit or any other kind of processing circuitry, which may comprise in addition various other components, for instance a further processor or a further memory.

Memory 304 is configured to store data, including for example fingerprint data, definitions of path sections and floor plans as example map data. In addition, memory 304 may also store any kind of data.

The at least one interface 305 is configured to enable communications with other apparatuses/devices/servers via at least one communication network 330, wherein communication network 330 may represent a wireless communication network, e.g. a WLAN network. Thus, the interface 305 may be configured to provide a WLAN interface. And/or, the interface 305 may be configured to provide an interface to a cellular communications network, i.e., as an example, the at least one communication network 330 may comprise a cellular network, and/or the interface may be configured to provide another non-wireless and/or wireless interface. Furthermore, as an example, the communication network 330 may be connected to the Internet 340.

As an example, the at least one interface 305 may be configured to detect signals from one or more kinds of beacons (not depicted in FIG. 3), for instance Bluetooth (BLE) beacons and/or WLAN access points, and optionally to enable a communication via one or more kinds of beacons.

The user interface 304 may comprise a touchscreen, as an example display, which enables a visual presentation of data to a user. In addition, it enables the input of a user via the display. It is to be understood that in addition and/or as an alternative to the touchscreen, apparatus 300 may comprise various other user interface components, like buttons, keys, a microphone, a loudspeaker, etc.

Apparatus 310 may be considered to represent an apparatus according to the first aspect of the invention.

If the system comprises two or more apparatuses 310, 310', apparatus 310' may correspond to apparatus 310. For this reason, components being the same in apparatus 310' as well as in apparatus 310 are omitted in apparatus 310' depicted in FIG. 3 (except for the at least one interface 305). Thus, all explanations given with respect to apparatus 300 also hold for apparatus 310'.

A user can use one apparatus of the at least one apparatus 310, 310' in order to report that a location of a map, which might be displayed on the display/touchscreen of the user interface 304, is considered to be associated with a problem by means of giving a feedback to the apparatus 300, e.g. via the user interface 304, wherein this feedback may be considered as information being associated with a location of the map, the location of the map being considered to be associated with a problem.

Figure 3B:
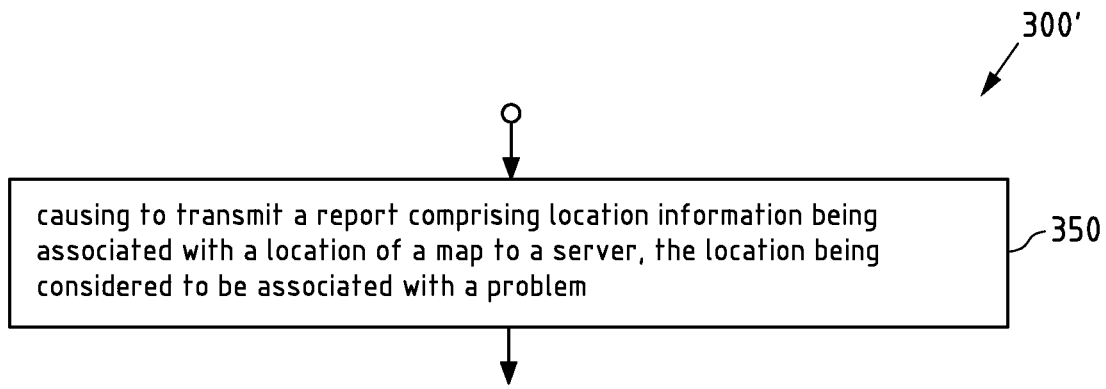
FIG. 3b is a flow chart illustrating further example embodiments of a method according to the first exemplary aspect of the invention.

For instance, after the apparatus 310 has obtained information being associated with a location of a map, the location of the map being associated with a problem, wherein this may correspond to action 210 of method 200, the apparatus 310 may be configured to cause to transmit a report comprising location information being associated with this location of a map to the server 320, the location being considered to be associated with a problem, e.g. according to action 350 of method 300' depicted in FIG. 3b. Furthermore, according to an example embodiment, this report may comprise other data, wherein this other may comprise a timestamp being indicative of the time when the information being associated with a location of a map has been obtained via a user interface, e.g. according to action 210, wherein this information on being associated with a location of a map is associated with this report. Furthermore, according to an example embodiment, the report may comprise a radio measurement observed by the apparatus, e.g. an on observed Received Signal Strength (RSS)-measurements as (e.g. 2-dimensional), e.g. based on WLAN or Bluetooth signals received at the apparatus, and/or the report may comprise an identifier of the type of apparatus of the apparatus, and/or an identifier of the apparatus, and/or other well-suited data.

According to an example embodiment, the obtained information being associated with a location of a map may comprise information being indicative of the location. For instance, the information being indicative of the location may be descriptive of the location or may identify the location. Then, for instance, the location information being associated with a location of a map transmitted during action 350 may represent or comprise this information being indicative of the location or may be determined based on this information being indicative of the location.

According to an example embodiment, the apparatus 300 may be configured to obtain information being indicative of the location of the map being considered to be associated with a problem from an application, wherein this application may represent a positioning application. As an example, the location information being associated with a location of a map transmitted during action 350 may represent or comprise this information being indicative of the location or may be determined based on this information being indicative of the location. For instance, this positioning application may be performed by apparatus 300 and may be configured to cause to render and/or display the map on a display of the user interface 304 of the apparatus 300. Further examples of obtaining information being indicative of the location of the map being considered to be associated with a problem from an application will be presented with respect to FIGS. 5a to 5b.

The transmission of the report from the apparatus 300' to server 320 caused by action 350 of method 300' may be performed via an interface of the at least one interface 305 and the communication network 330 and/or the Internet 340 to the server 320 via the interface 325 of the server. As an example, the connection between the apparatus 300 and the server 320 used for this transmission may be a secured transmission, e.g. based on encryption, e.g. based on SSH or any other well-suited secure protocol.

As an example, causing the transmission of the report from the apparatus 300' to the server 320 by action 350 may be performed within in a time interval less than 1 hour, or less than 30 minutes, or less than 10 minutes, or less than 5 minutes, or less than 3 minutes, or less than 1 minutes, or less than 30 seconds, or less than 10 seconds, or less than 5 second, or less than 3 seconds, or less than seconds or less than 1 seconds after the apparatus 300' has obtained the corresponding information being associated with the location, e.g. based on action 210 of method 200. Thus, it may be achieved that location information associated with the location obtained by apparatus 300', wherein the location is considered to be associated with a problem, can be reported online or nearly online and thus very quickly to the server 320. Accordingly, the server 320 may initiate actions depending on this received location information very quickly and, for instance, thus may result in enhance performance.

Server 320 may be for instance a dedicated location server or a general purpose server. For instance, it may be provided for supporting a positioning of mobile devices at a particular localization site or for supporting a positioning at a plurality of localization sites. Server 320 comprises a processor 321 that is linked to a first memory 322, to a second memory 324, and to an interface 325.

Processor 321 is configured to execute computer program code, including computer program code stored in memory 322, in order to cause server 320 to perform desired actions. It is to be understood that processor 321 may comprise or have access to a working memory for this purpose, for example in the form of a random access memory (not shown).

Memory 322 stores computer program code for receiving at least one report, wherein each report comprises location information being associated with a location of a map, wherein the location of the map is considered to be associated with a problem.

Figure 3C:
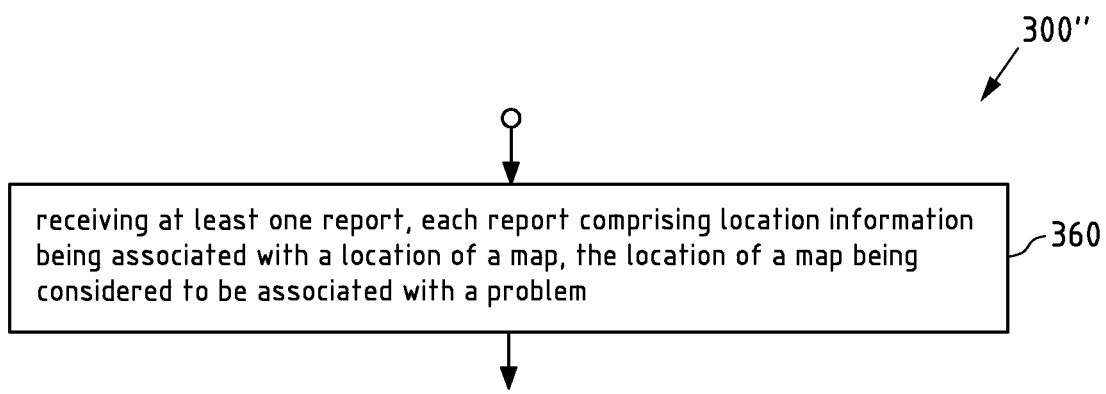
FIG. 3c is a flow chart illustrating further example embodiments of a method according to the second exemplary aspect of the invention.

The server 320 may be configured to receive such a report comprising information being associated with a location of a map, wherein the location of the map is considered to be associated with a problem via the interface 325 from one apparatus 310, 310' of the at least one apparatus 310, 310', e.g. by action 360 of method 300" depicted in FIG. 3c. For instance the server 320 may be configured to collect a plurality of received reports, wherein each report is received from a respective one apparatus 310, 310' of the at least one apparatus 310, 310', wherein this collecting may comprising storing at least the information being associated with a location of a map of such a report in the second memory 323. Furthermore, as an example, if a received report comprises other data, this other data may also be stored in the second memory 323 of the server 320. Furthermore, as an example, if a received report comprises other data, this other data may also be stored in the second memory 323 of the server 320.

For instance, system 300 may comprise a plurality of apparatus 310, 310' such that the server 320 can receive the reports from the plurality of apparatuses 310, 310". For instance, the reports may be collected and stored via a time span, wherein this time span may be one week, two weeks, one months or any other well-suited time span.

As an example, the memory 322 of server 320 may store further computer program code which may be used to act based on the received at least one report. For instance, this computer program code may be configured to perform the methods 310', 600, 700, 800, 900, 1000. Memory 322 may also store for instance an operating system for server 310. In addition, memory 312 may store any kind of data.

Processor 321 and memory 322 may optionally belong to a module 313, like a plug-in board or a chip or an integrated circuit or any other kind of processing circuitry, which may comprise in addition various other components, for instance a further processor or a further memory.

Interface 325 may be configured to enable a communication with other devices, for instance via the Internet 340.

It is to be understood that server 320 may comprise various other components, like a user interface.

FIG. 3c depicts a flow chart illustrating an example embodiment of a method 370 according to the exemplary first aspect of the invention. This method 370 may be used to display a map or to display at least a part of a map on a display, wherein this map may be used by a user for reporting a problem regarding a location of this map. As an example, this method 370 may be performed by the at least one apparatus 100 or one or each of at least one the apparatuses 300, 300', and, for instance, by the apparatus 410 which will be described later.

It is caused, by the apparatus 100, 310, 310' to display a map or at least a part of a map on a display (action 375). For instance, action 375 may be performed by a location application running on the apparatus, wherein the location application might be a positioning application. If the application is a positioning application, action 375 may further comprise to cause to display a location information on the display. For instance, the map displayed on display 420 of apparatus 410 depicted FIG. 5b might be displayed based on action 375, and, as an example, based on a location application being executed by the apparatus 410, wherein the reference sign 423 depicted in FIG. 5b might represent a location information which might indicate the estimated actual position of the apparatus 410 in the map. For instance, said positioning application might represent an indoor positioning application, which might be performed based on Wireless LAN (WLAN) and/or Bluetooth.

Figure 4A:
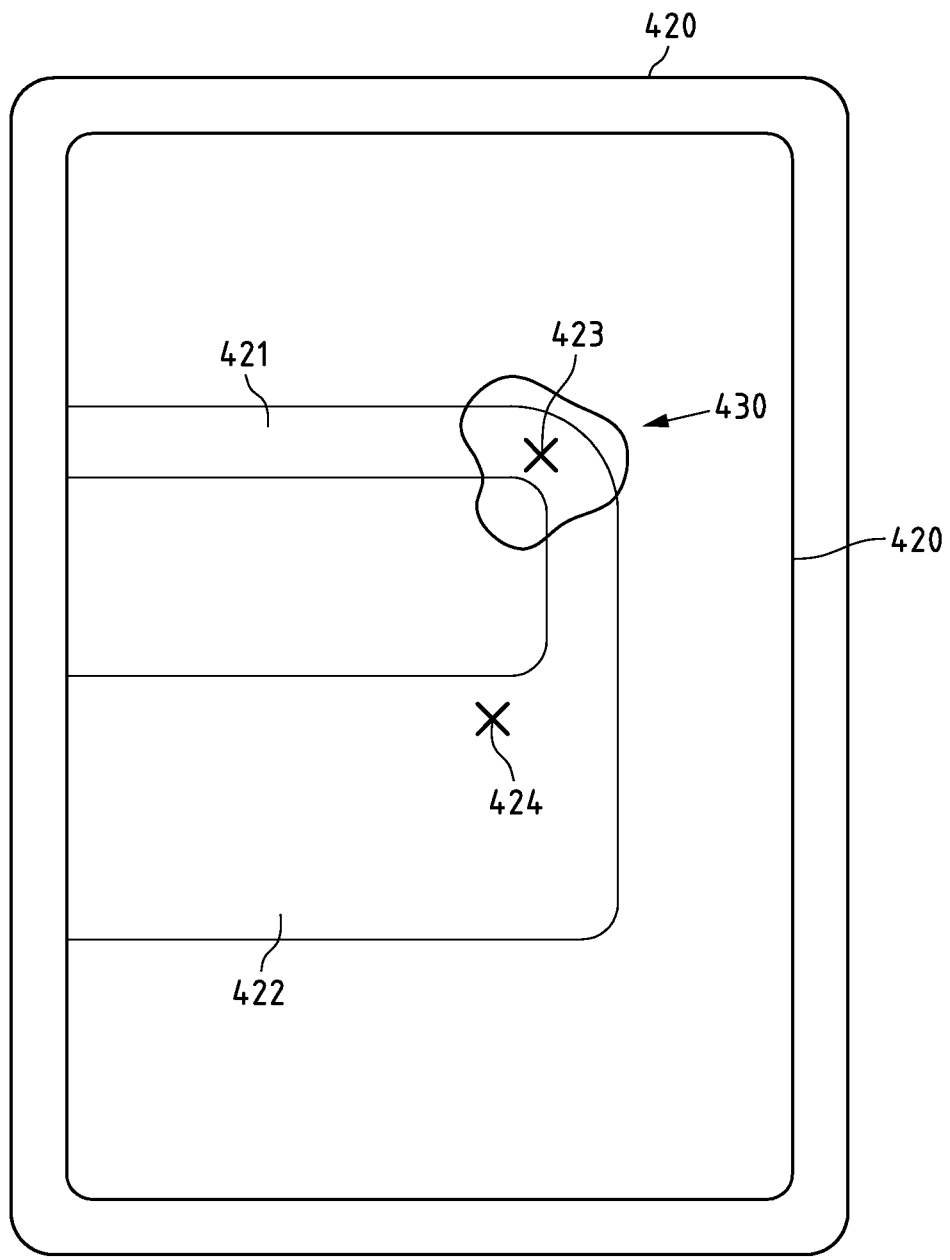
FIGS. 4a-4d are further example embodiments according to the first aspect of the invention.

FIG. 4a depicts a further example embodiment according to the first aspect of the invention.

This example embodiment comprises an apparatus 410 which might represent one of the apparatuses 100, 300, 300', 410 explained before.

According to this example embodiment, for instance, the location represents an area of the map, and wherein the information being indicative of the location comprises information being descriptive of this area.

The apparatus 410 comprises a display 420 which comprises an input functionality, e.g. such that a user can mark or point on the display and such that the apparatus 410 can obtain information on this user input on the display. Thus, the display 420 of apparatus 410 represents the user interface used for obtaining the information being indicative of the location of the map, wherein the location is considered to be associated with a problem, e.g. according to action 210 of method 200. For instance, display 420 might represent a touch display 420 or another display type also representing an input device. Furthermore, as an example, a location information 423 is displayed (or visualized) on the display 420, wherein the location information 423 might indicate the estimated actual position of the apparatus 410 in the map.

For instance, there might be a situation that a user of apparatus 410 may recognize that the location information 423 displayed on the map does not reflect the correct location, wherein, only as an example, the correct location of the apparatus 410 is indicated by reference sign 424. Thus, the user might consider the location of the map indicated by location information 423 to be associated with a problem, wherein in this example this problem represents a bad positioning performance at the location of the map. It has to be understood, that other problems of location of the map may be recognized by the user, e.g. missing constructions or a missing door or another change in the infrastructure which is not correctly reflected by the map.

According to an example embodiment, the user might indicate the location considered to be associated with a problem by marking or indicating an area 430 on the map, wherein the user may mark or indicate the area 430 on the display 423.

Thus, the information being associated with a location of a map obtained by apparatus 410 via the user interface (e.g. during action 210 of method 200), i.e., in this example via the display 420, comprises information being indicative of the location. In this example, the information being indicative of the location is input by the user via the display 420, e.g. by marking or indicating the area 430 assumed to represent the location which is associated with a problem. For instance, the apparatus 410 may be configured to be switched into a first state in which a user input via the display is assumed to represent an input of location on the map which is associated with a problem, wherein the apparatus 410 may be configured to be switched into a second state in which a user input is not assumed to represent an input of location on the map which is associated with a problem.

For instance, in case the apparatus 410 is in the first state, the information being indicative of the location is input by the user via the display 420 might be associated or might comprise an indicator, e.g. at least one bit, configured to specify that the associated location of this information being associated with a location is considered to be associated with a problem. Thus, this information being associated with a location of map can distinguished from a normal user input on the map being displayed on the display, e.g. when the user points to a location on the map in order to define a target destination.

Accordingly, the user can identify an area 430 considered to be associated with location on the map which is assumed to be problematic by marking or identifying the area on the display 420, e.g. by movement of a user's finger on the respective part of the map or by movement of an input device (e.g. a pen or something else) on at least a part of the map indicating this area 430. Thus, as an example, the information being indicative of the location might comprise information on a movement of a user's finger on at least a part of the map, and/or information on a movement of an input device on at least a part of the map.

Figure 4B:
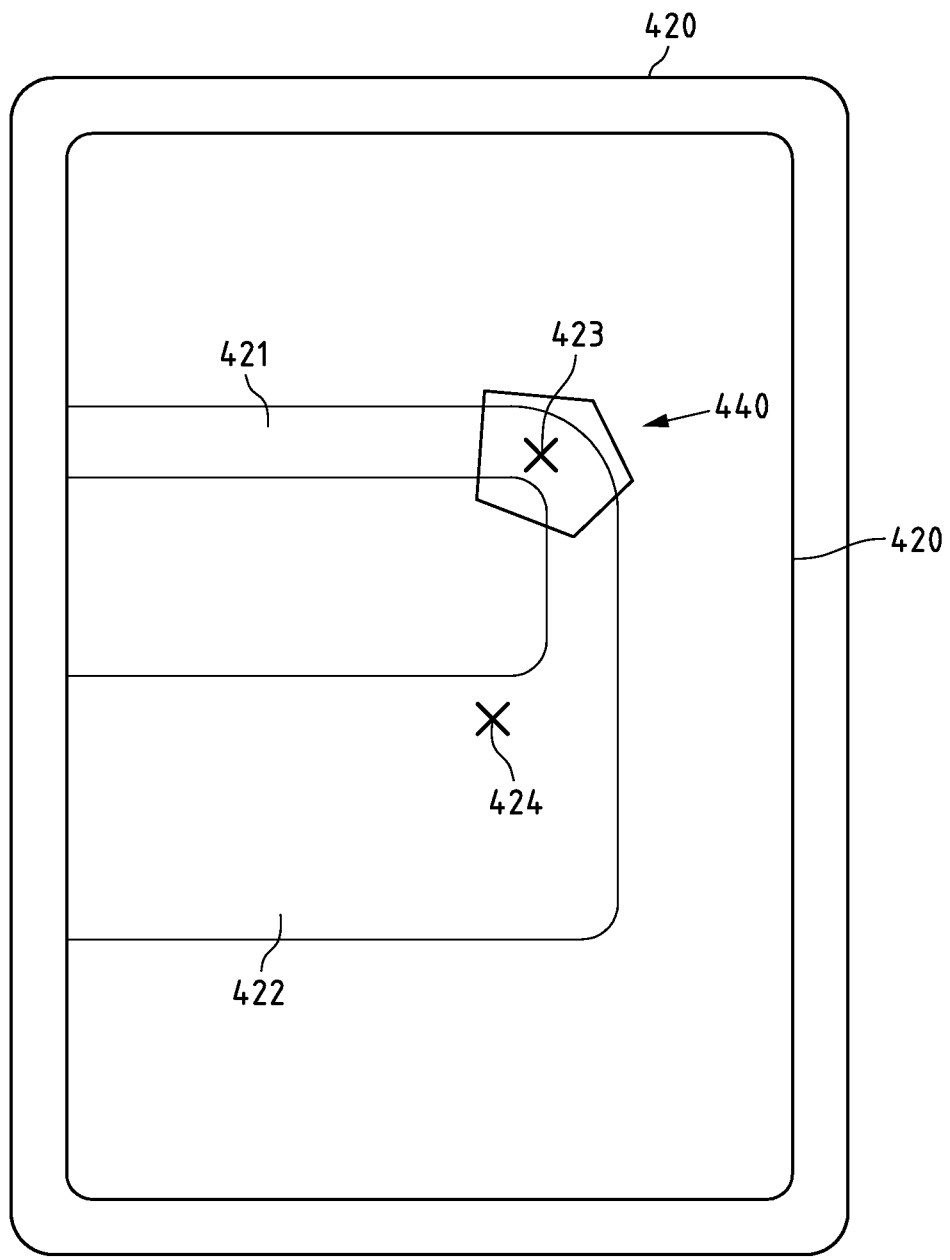

FIG. 4b depicts a further example embodiment according to the first aspect of the invention.

This example embodiment comprises an apparatus 410 which might represent one of the apparatuses 100, 300, 300', 410 explained before. In particular, the apparatus 410 depicted in FIG. 4b may correspond to the apparatus 410 depicted FIG. 4b. FIG. 4b is illustrative of a different or special input of the user in order to mark or identify an area 440 on the map visualized on display 420 compared to the marked area 430 depicted in FIG. 4a.

In this example the user can mark or identify an area 440 considered to be associated with location on the map which is assumed to be problematic by marking or identifying the area on the display 420, e.g. by movement of a user's finger on the respective part of the map or by movement of an input device (e.g. a pen or something else) on at least a part of the map indicating this area 440, wherein this area 440 is described by a polygon. Thus, as an example, the information being indicative of the location might comprise information on a polygon being associated with the area 440 of the map.

Thus, as an example embodiment, the information being descriptive of this area comprises information on a polygon being associated with the area of the map.

Figure 4C:
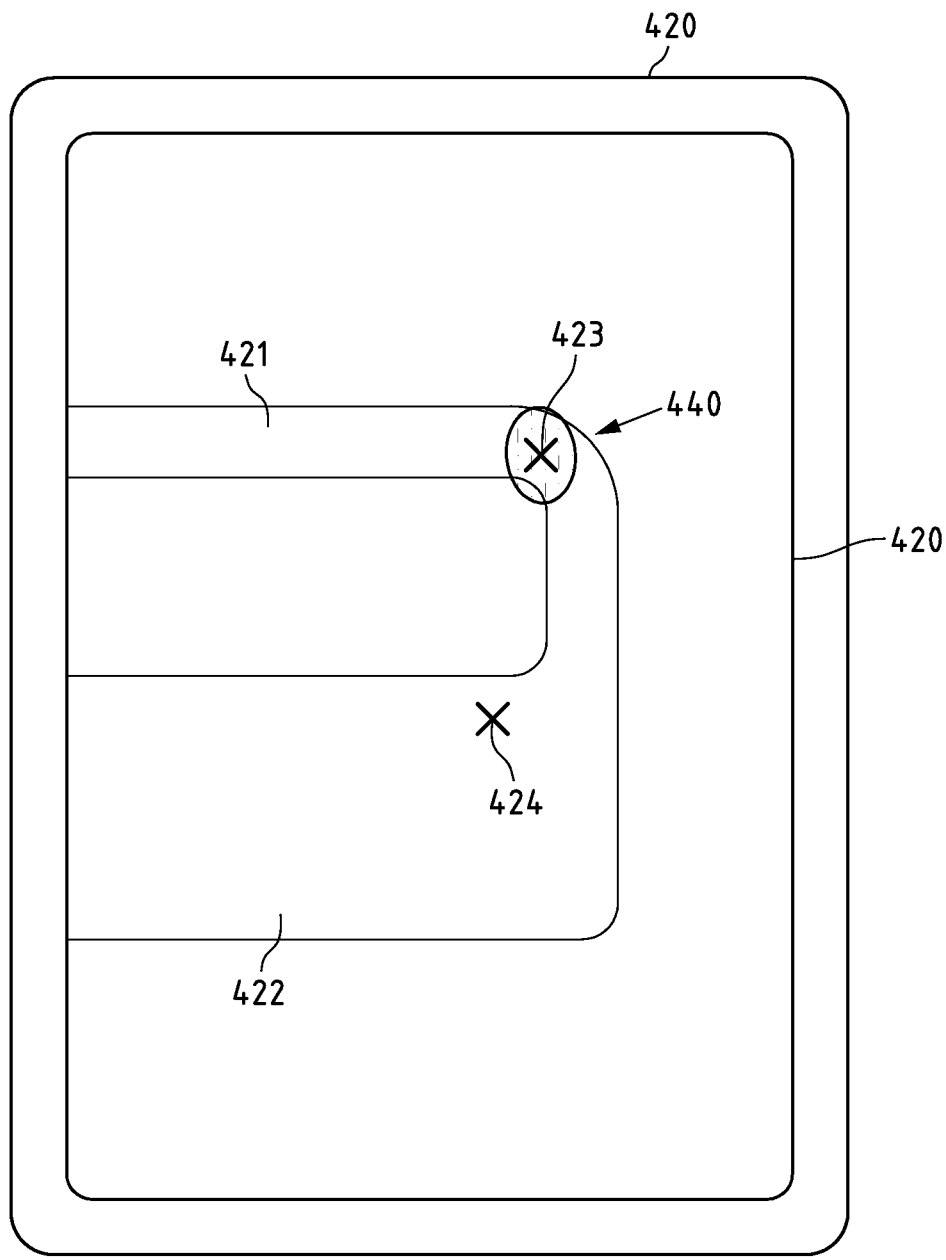

FIG. 4c depicts a further example embodiment according to the first aspect of the invention.

This example embodiment comprises an apparatus 410 which might represent one of the apparatuses 100, 300, 300', 410 explained before. In particular, the apparatus 410 depicted in FIG. 4b may correspond to the apparatus 410 depicted FIG. 4b. FIG. 4b is illustrative of a different or special input of the user in order to mark or identify an area 440 on the map visualized on display 420 compared to the marked area 430 depicted in FIG. 4a.

In this example the user can identify an area 430 considered to be associated with location on the map which is assumed to be problematic by marking or identifying the area on the display 420, by pressing the user's finger on the respective part of the map indicating this area 440, wherein this area 440 may basically correspond to a shape of a fingerprint. Thus, as an example, the information being indicative of the location might comprise information on this area 440.

Figure 4D:
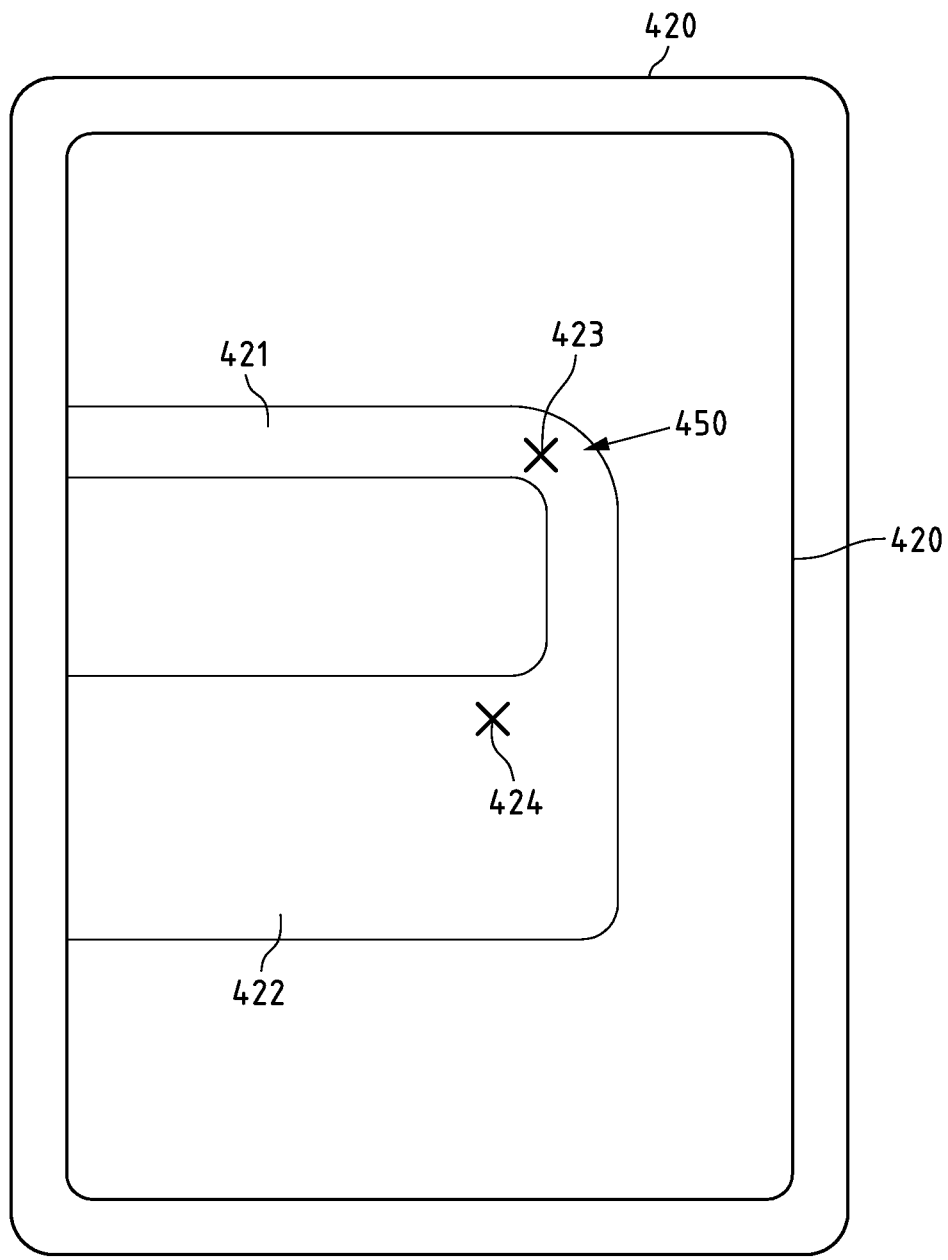

FIG. 4d depicts a further example embodiment according to the first aspect of the invention.

This example embodiment comprises an apparatus 410 which might represent one of the apparatuses 100, 300, 300', 410 explained before. In particular, the apparatus 410 depicted in FIG. 4c may correspond to the apparatus 410 depicted FIG. 4c. FIG. 4c is illustrative of a different or special input of the user in order to mark or identify a point 450 on the map visualized on display 420, wherein this point 450 on the map is considered to be associated with the location on the map which is assumed to be problematic, e.g. by pointing the user's finger on the location 450 on the map or by using a pointing device to indicate this location 450 on the map. Thus, as an example, the information being indicative of the location might comprise information on a respective point of the map.

Thus, for instance, in the example embodiments according to the first aspect of the invention depicted in FIG. 4a to FIG. 4d, the information being associated with a location of a map obtained by apparatus 410 via the user interface (e.g.

during action 210 of method 200), i.e., in this example via the display 420, comprises information being indicative of the location.

Figure 5A:
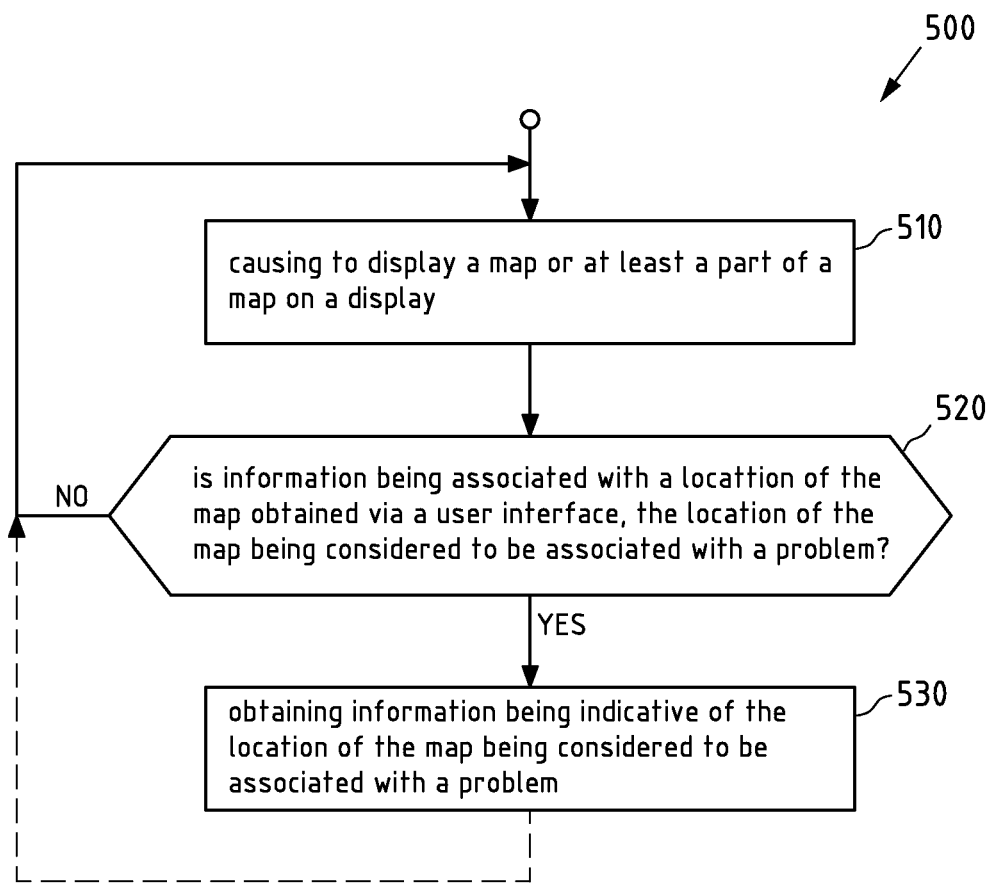
FIG. 5a is a flow chart illustrating further example embodiments of a method according to the first exemplary aspect of the invention.
Figure 5B:
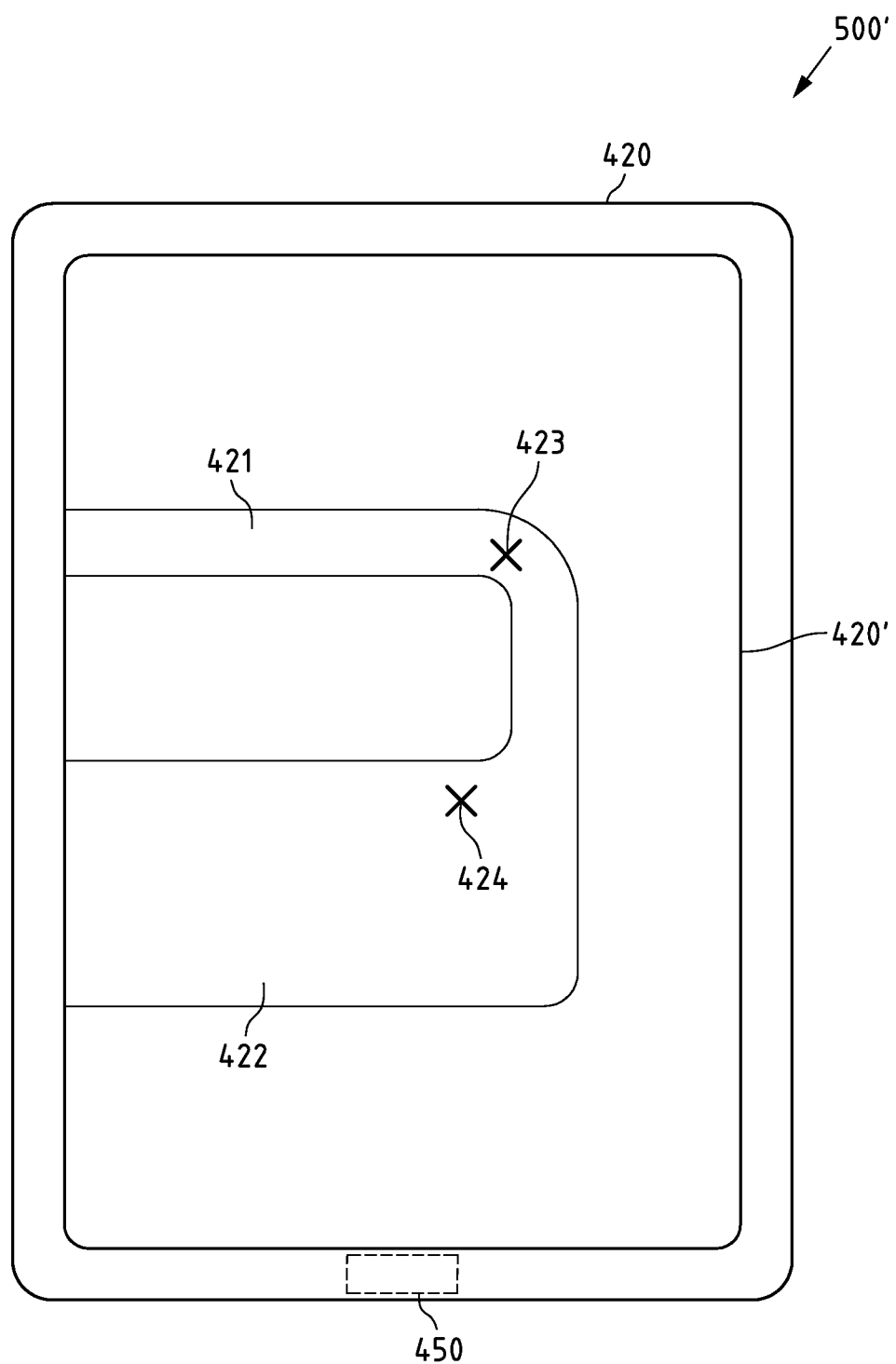
FIG. 5b is a further example embodiment according to the first aspect of the invention.

FIG. 5*a* depicts a flow chart illustrating an example embodiment of a method 500 according to the exemplary first aspect of the invention. As an example, this method 500 may be performed by the at least one apparatus 100 or one or each of at least one the apparatuses 300, 300', and, for instance, by the apparatus 410. This method 500 will be explained in conjunction the further example embodiment according to the first aspect of the invention depicted in FIG. 5*b*, wherein this example embodiment comprises an apparatus 410 which might represent one or may be based on one of the apparatuses 100, 300, 300', 410 explained before.

For instance, method 500 may comprise optional action 510 in order to cause to display a map or at least a part of a map on a display, wherein action 510 may correspond to action 375 of method 370 depicted in FIG. 3*c* and wherein the display may, for instance, represent display 410. This method 370 may be used to display a map or to display at least a part of a map on a display, wherein this map may be used by a user for reporting a problem regarding a location of this map. For instance, action 510 may be performed by a location application running on the apparatus, wherein the location application might be a positioning application. If the application is a positioning application, action 510 may further comprise to cause to display a location information 423 on the display. For instance, said positioning application might represent an indoor positioning application, which might be performed based on Wireless LAN (WLAN) and/or Bluetooth. Thus, as an example, the user can use the map displayed on display 420 for location information and/or positioning information.

In action 520 it is checked whether information being associated with a location of a map is obtained via a user interface of the apparatus, the location of the map being considered to be associated with a problem, wherein this obtaining information being associated with a location may be performed by or according to action 210 of method 200 of FIG. 2.

If there is no such information being associated with a location of a map is obtained via a user interface of the apparatus, the location of the map being considered to be associated with a problem, the method 500 may proceed with optional action 510. Furthermore, as one example embodiment, the checking in action 520 may be performed independently from action 510, wherein, as an example, action 510 may be performed by location application (e.g. a positioning application) being executed on the apparatus and wherein actions 520 and 530 may be performed by another application being executed on the apparatus. Furthermore, as another example embodiment, actions 510, 520 and 530 of method 500 may be performed by a single one application, e.g. a location application which might be a positioning application.

If checking in action 520 yields a positive result, method 500 obtains information being indicative of the location of the map being considered to be associated with a problem in action 530.

Thus, as an example embodiment, said obtaining information being indicative of the location of the map being considered to be associated with a problem from an application (action 530) may be triggered at least partially based on said obtaining, via the user interface, information being associated with a location of a map (action 210).

As an example, the information being indicative of the location of the map being considered to be associated with a problem be obtained in action 530 is not obtained from the information being associated with a location obtained via the user interface, e.g. according to action 210 of method 200.

The apparatus 410 comprises a display 420', which might comprise an input functionality, e.g. such that a user can mark or point on the display, but, according to another example embodiment, which might not comprise an input functionality. Thus, the user interface used for obtained the information being associated with a location, the location being considered to be associated with problem, e.g. according to action 210 of method 200, might comprise or represent the display, but also might represent another user interface, e.g. an optional button 450 of the apparatus or a microphone (not depicted in FIG. 5*b*) or a key pad (not depicted in FIG. 5*b*) or any other well-suited user interface.

For instance, there might be a situation that a user of apparatus 410 may recognize that the location information 423 displayed on the map does not reflect the correct location, wherein, only as an example, the correct location of the apparatus 410 is indicated by reference sign 424. Thus, the user might consider the location of the map indicated by location information 423 to be associated with a problem, wherein in this example this problem represents a bad positioning performance at the location of the map. It has to be understood, that other problems of location of the map may be recognized by the user, e.g. missing constructions or a missing door or another change in the infrastructure which is not correctly reflected by the map.

If the user recognizes that a location of the map displayed on display 420' is considered to be associated with a problem, the user may just may interact with user interface in order to input a signal, wherein the signal represents information being associated with a location of a map, the location of the map being considered to be associated with a problem, since this signal indicates that a location of the map or of the part of the map currently displayed on display 420' has a problem. Thus, the signal itself may not comprise information being descriptive of the location, but due to the temporal relationship of this signal and the currently displayed map or part of the map it is possible, based on this signal obtained via the user interfaced, to estimate or obtain the location of the map being considered to be associated with a problem, since this location is the location of the map or the part of the map which is currently displayed on the display or which was displayed immediately before.

For instance, the user may press the optional button 450, such that the information being associated with a location of a map is obtained via a user interface of the apparatus, the location of the map being considered to be associated with a problem, represents a signal received or triggered by pressing this button 450, or the user may just tip on the display 420' (in case it is a touchscreen), such that detection of this tipping on the display 420' may represent the information being associated with a location of a map obtained via a user interface, or the user may speak into an optional microphone of apparatus 410, wherein this received voice is detected and may represent or be the basis for the information being associated with a location of a map is obtained via a user interface, or wherein the user interface 420' may comprise a wireless interface or wired interface, such that a user may use a kind of remote control, e.g. a wireless input device being connected to the wireless interface or a wired input device connected to the wired interface, wherein the user may input a signal to wireless input device or the wired input device, e.g. by pressing a button or acting with another input interface of the wireless or wired input device, when the user recognized that a location of the map displayed on display 420' is considered to be associated with a problem.

As an example, the being associated with a location of a map is obtained via the user interface of the apparatus, the location of the map being considered to be associated with a problem, may not comprise information being descriptive on the location.

Accordingly, when checking in action 520 yields a positive result, a new information being associated with a location of a map, the location of the map being considered to be associated with a problem, has been received via the user interface, and thus, the temporal relationship of this obtained information and the currently displayed map or part of the map (or the map or part of the map which was displayed just before) can be used in action 530 in order to obtain information being indicative of the location of the map being considered to be associated with a problem, e.g. from the application which causes to display the map or at least a part of the map on the display, e.g. during action 510. In this case, the map or part of the map currently displayed (or displayed immediately before) on the display 420' is assumed to represent a location being considered to be associated with a problem, since it is not possible to specify the location in more detail. Nevertheless, this information regarding the location of the complete map or part of the map currently displayed (or displayed immediately before) in the display 420' may be still very helpful information since the displayed map is usually only small sub-part of a much bigger map, and thus this location information is still useful in order to evaluate the problem, since it narrows the location down to the displayed map and thus, other location being outside of the displayed may can be neglected when searching for the problem.

Furthermore, for instance, according to an embodiment, the information being indicative on the location of the map being considered to be associated with a problem may be obtained from a positioning engine, e.g. an indoor positioning engine of the apparatus 420'. This actual position received from the positioning engine can still be assumed to represent the information being indicative on the location of the map being considered to be associated with a problem, since the actual position at least basically correspond to the position of the map being displayed on the display 420'.

As an example, the information being indicative on the location of the map being considered to be associated with a problem obtained during action 530 can be transmitted during action 350 as part of the report comprising location information being associated with a location, the location being considered to be associated with a problem.

Thus, method 500 may enable the user a very easy way in order to report a problem of a location displayed on the map.

Figure 6:
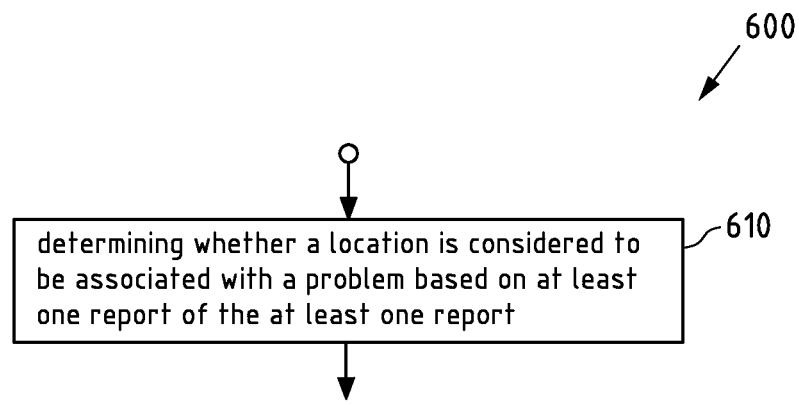
FIG. 6 is a flow chart illustrating further example embodiments of a method according to the second exemplary aspect of the invention.

FIG. 6 depicts a flow chart illustrating further example embodiments of a method 600 according to the second exemplary aspect of the invention. For instance, this method 600 may be performed by the server 320 depicted in FIG. 3*a*, and, as an example, this method 600 may be performed after method 300" depicted in FIG. 3*c* has been performed by the server 320.

Thus, it may be assumed that server 320 has received at least one report, each of the at least one report comprising information being associated with a location of a map, wherein the location of the map is considered to be associated with a problem, e.g. as explained with respect to action 360 depicted in FIG. 3*c*. For instance the server 320 may be configured to collect a plurality of received reports, wherein each report is received from a respective one apparatus 310, 310' of the at least one apparatus 310, 310', wherein this collecting may comprising storing at least the information being associated with a location of a map of such a report in the second memory 323. Furthermore, as an example, if a received report comprises other data, this other data may also be stored in the second memory 323 of the server 320. As an example, system 300 may comprise a plurality of apparatuses 310, 310' such that the server 320 can receive the reports from the plurality of apparatuses 310, 310". For instance, the reports may be collected and stored via a time span, wherein this time span may be one week, two weeks, one months or any other well-suited time span.

Based on at least one report of the received at least one report the server determines whether a location is considered to be associated with a problem.

For instance, according to one embodiment, each time when the server receives a report from one apparatus according to the first aspect of the invention, the location according to the location information of this report might be determined to be considered to be associated with a problem in action 610. As an example, in this case, the server 320 might be configured to provide an alarm message, e.g. according to action 810 of method 800 depicted in FIG. 8. This alarm message may represent an email or another electronic message, and might be a message provided to a service provider. Then, after receipt of this message, the service provider is information on the problem of the location indicated by this alarm message. Thus, this alarm message may directly show the location being assumed to be problematic (e.g. assumed to be affected) or may comprise a link to the location, and thus it can be reacted in order to solve this problem. For instance, method 800 of FIG. 8 may also be performed by server 320.

Furthermore, for instance, said determining whether a location is considered to be associated with a problem in action 610 may be performed based on a plurality of reports, wherein each report of the plurality of reports comprises information being associated with a location of a map, wherein the location of the map is considered to be associated with a problem. As an example, statistical algorithms may be applied to determine whether a location is considered to be associated with a problem or not in action 610, wherein two or more reports are applied, and wherein each of the two or more reports are associated with the location which is determined to be associated with a problem or not.

Figure 7:
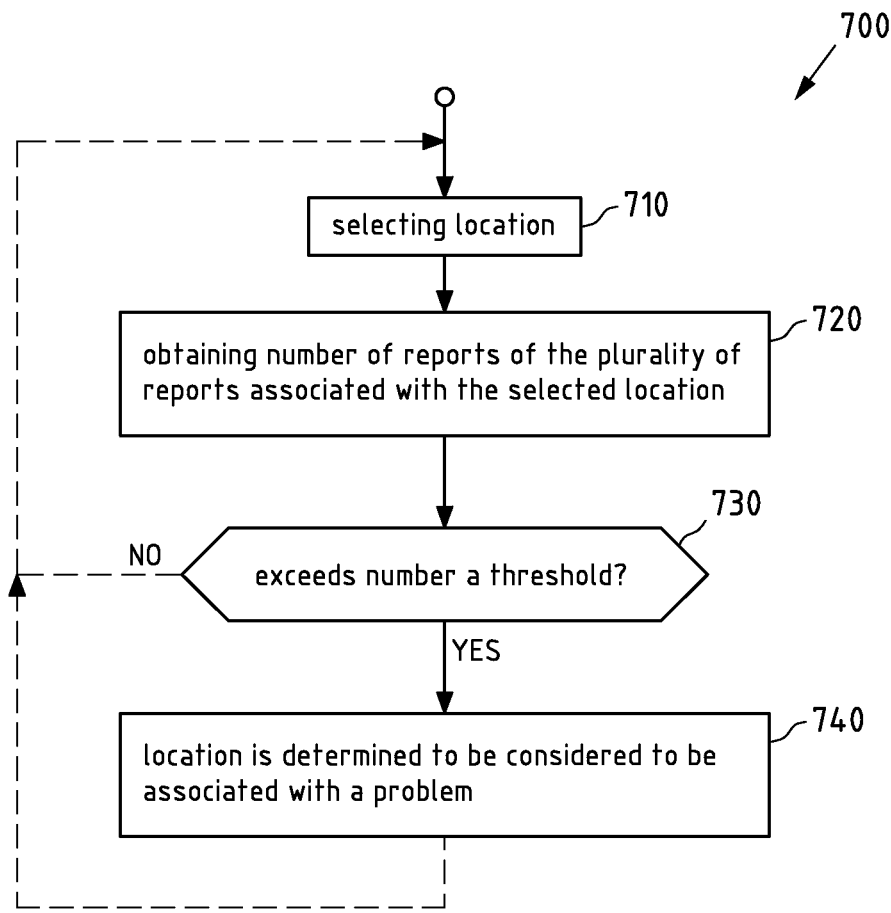
FIG. 7 is a flow chart illustrating further example embodiments of a method according to the second exemplary aspect of the invention.

As a non-limiting example, FIG. 7 is a flow chart illustrating further example embodiments of a method 700 according to the second exemplary aspect of the invention which could be used for determining whether a whether a location is considered to be associated with a problem based on two or more reports. For instance, this method 700 may be performed by the server 320 depicted in FIG. 3*a*.

According to an example embodiment of the second aspect of the invention, said at least one report is a plurality of reports, and wherein said determining whether a location is considered to be associated with a problem comprises determining whether a number of reports of the plurality of reports associated with the location exceeds a threshold, wherein this example embodiment may be realized by method 700.

In action 710 a location is selected. For instance, this location may correspond to a specific area or point of a map, wherein, as an example, this map may be used for a location and/or positioning application, e.g. an indoor radio map. For instance, a map may be divided into two are more locations, e.g. into two or more areas.

In action 720 a number of reports of a plurality of reports associated with the selected location is obtained. For instance, this plurality of report may represent reports received by action 360 of method 300", wherein these reports may be stored in the server 320.

As an example embodiment, the plurality of reports used in action 720 may represent reports being associated with a time-span, wherein this time-span may be one day, three days, one week, two weeks, one month, or any other well-suited time-span. Thus, as an example, only those reports are considered which has been received by the server during this time span and/or which have timestamp being within this time-span. For instance, this time-span may be assumed to begin at the present and then might go back in time, i.e., an example of a time-span of one week would result in considering reports that have been received only during the last week and/or reports having a timestamp being within the last week. Thus, older reports would not be considered.

In action 730 it is checked whether the number obtained in action 720 exceeds a threshold. For instance, this threshold may be 1, or 3, or 4, or 5, or 8, or 9, or 10, or any other well-suited value.

Thus, for instance, only if the number of reports obtained in action 720 exceeds this threshold, the selected location is determined to be considered to be associated with a problem, as indicated by action 740 in method 700. Thus, a single report may not yet cause any actions, but, as an example, e.g. five over a week would.

Figure 8:
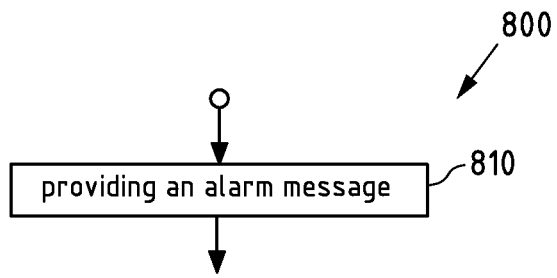
FIG. 8 is a flow chart illustrating further example embodiments of a method according to the second exemplary aspect of the invention.

Furthermore, if the number exceeds the threshold in action 730, method 800 depicted in FIG. 8 may be triggered such that an alarm message is provided, e.g. as already explained, wherein this alarm message may represent an email or another electronic message, and might be a message provided to a service provider. Then, after receipt of this message, the service provider is information on the problem of the location indicated by this alarm message. Thus, this alarm message may directly show the location being assumed to be problematic (e.g. assumed to be affected) or may comprise a link to the location, and thus it can be reacted in order to solve this problem.

For instance, the threshold used in action 730 may be set by an operator.

If the obtained number does not exceed the threshold and thus checking in action 730 yields a negative result, method 700 may, for instance, begin with action 710 in order to select another location.

Figure 9:
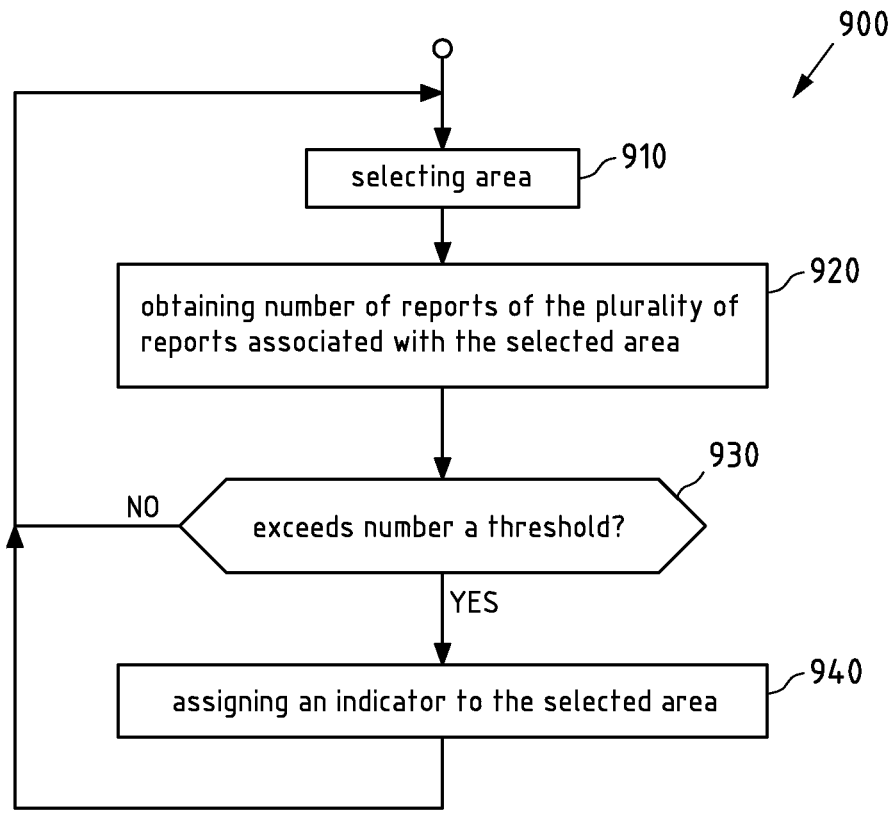
FIG. 9 is a flow chart illustrating further example embodiments of a method according to the second exemplary aspect of the invention.

FIG. 9 depicts a flow chart illustrating further example embodiments of a method 900 according to the second exemplary aspect of the invention. For instance, this method 900 may be performed by the server 320 depicted in FIG. 3a, and, as an example, this method 900 may be performed after method 300" depicted in FIG. 3c has been performed by the server 320.

In action 910 an area of a map is selected. The map may be used for a location and/or positioning application, e.g. an indoor radio map. For instance, a map may be divided into two are more areas, two or more areas, or the two or more areas may represent different areas of the map.

In action 920 a number of reports of a plurality of reports associated with the selected area is obtained. For instance, this plurality of report may represent reports received by action 360 of method 300", wherein these reports may be stored in the server 320.

As an example embodiment, the plurality of reports used in action 920 may represent reports being associated with a time-span, wherein this time-span may be one day, three days, one week, two weeks, one month, or any other well-suited time-span. Thus, as an example, only those reports are considered which has been received by the server during this time span and/or which have timestamp being within this time-span. For instance, this time-span may be assumed to begin at the present and then might go back in time, i.e., an example of a time-span of one week would result in considering reports that have been received only during the last week and/or reports having a timestamp being within the last week. Thus, older reports would not be considered.

In optional action 930 it is checked whether the number obtained in action 920 exceeds a threshold. For instance, this threshold may be 1, or 3, or 4, or 5, or 8, or 9, or 10, or any other well-suited value. This threshold may be equal to the threshold used in action 730, but it also may differ from the threshold used in action 730.

Thus, for instance, only if the number of reports obtained in action 920 exceeds this threshold, an indicator is assigned to the selected area 940. For instance, this indicator may be assigned based on the determined number of reports, wherein the indicator may be indicative of the number of reports. Thus, the indicator may be used to determine whether there are only a few reports associated with this area and thus the probability of an error in this area is small, or whether there are a lot of reports associated with this area and thus the probability of an error in this area is high.

Furthermore, according to an example embodiment, action 930 is removed from method 900 and there is always assigned an indicator to the selected areas after the number has been obtained in action 920, wherein the indicator is based on the determined number of reports, wherein the indicator may be indicative of the number of reports.

Method 900 may then proceed with action 910 in order to select a new area of the map.

According to an example embodiment of the second aspect of the invention, a map comprises at least two areas, wherein for each area of the at least two areas it is performed: (i) determining the number of records associated with the respective area, and (ii) assigning an indicator to the respective area based on the determined number of records, wherein this example embodiment may be performed by or based on method 900.

Figure 10:
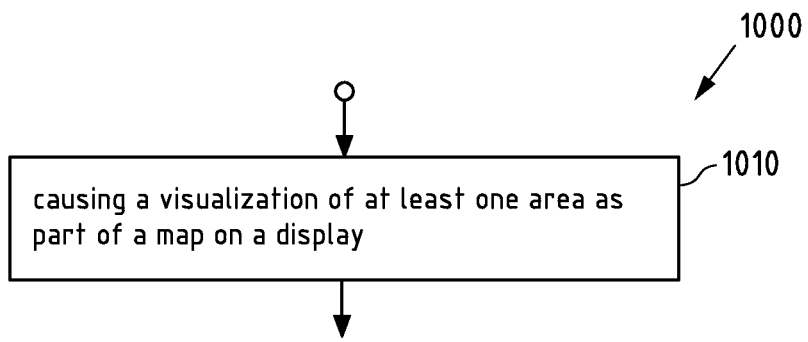
FIG. 10 is a flow chart illustrating further example embodiments of a method according to the second exemplary aspect of the invention.

FIG. 10 is a flow chart illustrating further example embodiments of a method 1000 according to the second exemplary aspect of the invention. For instance, this method 1000 may be performed by server 320 depicted in FIG. 3a.

Action 1010 of method 1000 cases a visualization of at least one area as part of a map on a display. For instance, if an area of the at least one area is associated with an indicator obtained by method 900, the visualization of the respective area comprises an information indicating problems associated with location(s) in this area, wherein this information indicating problems may be determined based on the respective indicator. For instance, this information indicating problems could be a color, which is used to color the area to be displayed, wherein the color corresponds to a degree of problems which can be determined based on the respective indicator. As an example, the area can be redder the more problems the respective indicator indicates. Then, for instance, this map could be displayed, e.g. on a display of the server or on another display, such that the operator may get on one glance an idea, which are the worst affected areas.

Figure 11:
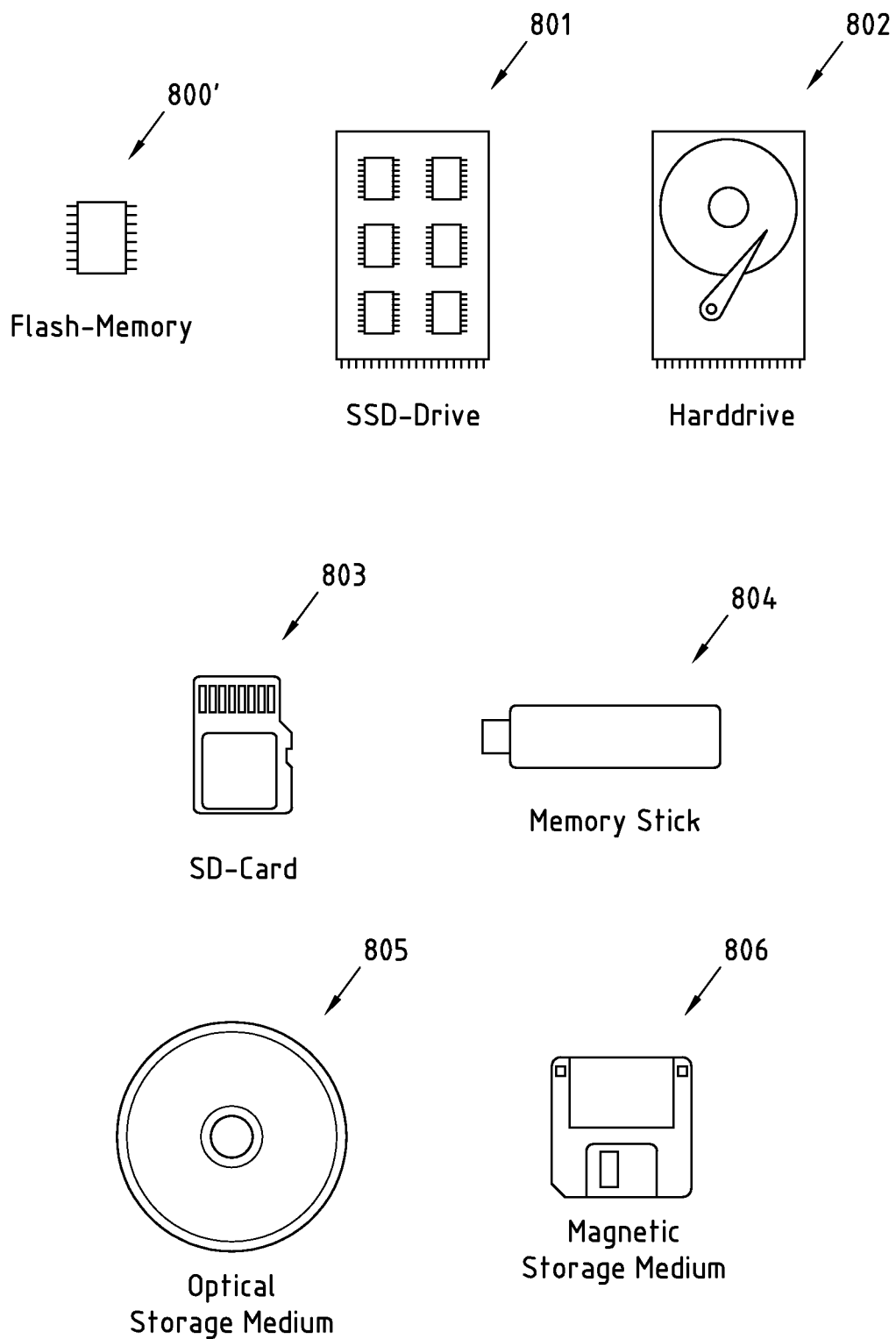
FIG. 11 is a schematic illustration of examples of tangible storage media according to the present invention.

FIG. 11 is a schematic illustration of examples of tangible storage media according to the present invention, that may for instance be used to implement memory 102 of FIG. 1, program memory 302 of FIG. 3a and/or program memory 304 of FIG. 3a and/or program memory 322 of FIG. 3a and/or memory 323 of FIG. 3a. To this end, FIG. 8 displays a flash memory 800', which may for instance be soldered or bonded to a printed circuit board, a solid-state drive 801 comprising a plurality of memory chips (e.g. Flash memory chips), a magnetic hard drive 802, a Secure Digital (SD) card 803, a Universal Serial Bus (USB) memory stick 804, an optical storage medium 805 (such as for instance a CD-ROM or DVD) and a magnetic storage medium 806.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program code) may also be used in a corresponding manner in an example embodiment of any other category. It should also be understood that presence of a feature in the presented example embodiments shall not necessarily mean that this feature forms an essential feature of the invention and cannot be omitted or substituted.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. A method performed by at least one apparatus, the method comprising:
    receiving an indoor positioning radio measurement observed by the at least one apparatus and including one or more signal strengths;
    obtaining, via a user interface, information being associated with a location of a map determined using the indoor positioning radio measurement, the location of the map being considered to be associated with a radio map that is out of date or incorrect, wherein the radio map that is out of date or incorrect because one or more radio nodes included in the radio map have moved or because of an infrastructure change affecting the radio map;
    generating a report comprising the location of the map obtained via the user interface considered to be associated with the radio map that is out of date or incorrect; and
    transmitting the report comprising location information being associated with the location of the map obtained via the user interface to a server, the location of the map being considered to be associated with the radio map that is out of date or incorrect.

2. The method according to claim 1, wherein the location represents an area of the map, and wherein the information being associated with the location comprises information being descriptive of the area of the map.

3. The method according to claim 2, wherein the information being descriptive of the area of the map comprises information on a polygon being associated with the area of the map.

4. The method according to claim 2, wherein the information being descriptive of this area comprises at least one of:
    information on a movement of a user's finger on at least a part of the map, and/or
    information on a movement of an input device on at least a part of the map.

5. The method according to claim 1, wherein the location of the map represents a point of the map.

6. The method according to claim 1, further comprising:
    causing the at least one apparatus to provide the map on a display, wherein the display is part of the user interface.

7. The method according to claim 1, further comprising:
    obtaining information being indicative of the location of the map being considered to be associated with a problem from a positioning application operable with the radio map.

8. The method according to claim 7, wherein obtaining information being associated with the location of the map is in response to a positioning performance of the positioning application.

9. The method according to claim 8, wherein the information being associated with the location of the map corresponds to a location displayed on the map on a display via the positioning application.

10. The method according to claim 1, wherein the report comprises the indoor positioning radio measurement.

11. The method according to claim 1, wherein the server determines a position of the at least one apparatus using the indoor positioning radio measurement and the radio map, wherein the position is associated with a problem indicative of the radio map that is out of date or incorrect.

12. The method according to claim 1, further comprising:
    determining a position of the at least one apparatus using the indoor positioning radio measurement and the radio map, wherein the position is associated with a problem indicative of the radio map that is out of date or incorrect.

13. An apparatus comprising at least one processor and at least one memory including computer program code, the at least one memory and the computer program code configured to, with the at least one processor, cause an apparatus at least to perform:
receiving an indoor positioning radio measurement observed by the at least one apparatus and including one or more signal strengths;
obtaining, via a user interface, information being associated with a location of a map determined using the indoor positioning radio measurement, the location of the map being considered to be associated with a radio map that is out of date or incorrect, wherein the radio map that is out of date or incorrect because one or more radio nodes included in the radio map have moved or because of an infrastructure change affecting the radio map;
generating a report comprising the location of the map considered to be associated with the radio map that is out of date or incorrect; and
transmitting the report comprising location information being associated with the location of the map to a server, the location of the map being considered to be associated with the radio map that is out of date or incorrect.

14. A method performed by at least one apparatus, the method comprising:
receiving at least one report, wherein each report comprises location information being associated with a location of a map, the location of the map being considered to be associated with a radio map that is out of date or incorrect,
wherein the radio map that is out of date or incorrect because one or more radio nodes included in the radio map have moved or because of an infrastructure change affecting the radio map,
wherein each report comprises a radio measurement observed by a wireless interface and including one or more signal strengths from an indoor positioning radio measurement observed by the at least one apparatus.

15. The method according to claim 14, further comprising:
determining whether a location is considered to be associated with a problem based on at least one report.

16. The method of claim 15, wherein said at least one report is a plurality of reports, and wherein said determining whether a location is considered to be associated with a problem comprises determining whether a number of reports of the plurality of reports associated with the location exceeds a threshold.

17. The method of claim 15, further comprising:
providing an alarm message if the location is considered to be associated with the problem.

18. The method of claim 14, wherein a map comprises at least two areas, the method comprising, for each area of the at least two areas:
determining a number of records associated with the respective area, and
assigning an indicator to the respective area based on the determined number of records.

* * * * *